H. S. CATE.
Packing for Oil-Wells.

No. 202,988.  Patented April 30, 1878.

WITNESSES:
F. McArdle
C. Sedgwick

INVENTOR:
H. S. Cate
BY Munn & Co
ATTORNEYS.

UNITED STATES PATENT OFFICE.

HENRY S. CATE, OF MILLERSTOWN, (BARNHART'S MILLS P. O.,) PA.

IMPROVEMENT IN PACKINGS FOR OIL-WELLS.

Specification forming part of Letters Patent No. 202,988, dated April 30, 1878; application filed April 5, 1878.

*To all whom it may concern:*

Be it known that I, HENRY S. CATE, of Millerstown, (Barnhart's Mills P. O.,) in the county of Butler and State of Pennsylvania, have invented a new and Improved Packing for Oil-Wells, of which the following is a specification:

The object of my invention is to furnish an improved adjustable and removable rubber packing, to be attached to the casing-head on oil-wells, and surrounding the tubing or cable, for the purpose of preserving the vacuum or controlling flowing oil and gas while drawing tubing from or while drilling wells.

The invention consists in the combination of two or more centrally-perforated disks, formed of circle-sectors, and clamped together so that the sectors of one disk cover the joints between the sectors of the other, with the casing-head and tubing or cable of an oil-well, as will be hereinafter described.

Figure 1:
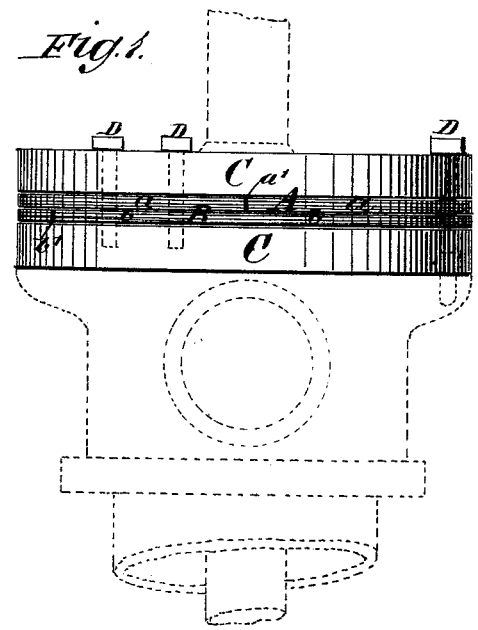
Figure 2:
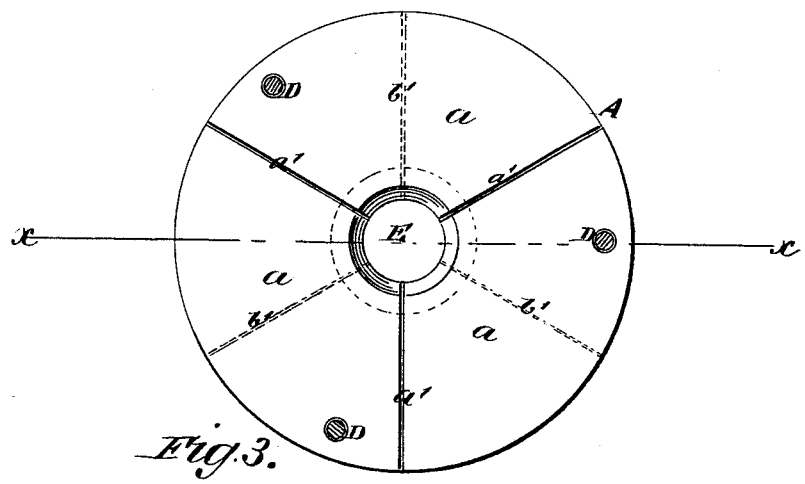
Figure 3:
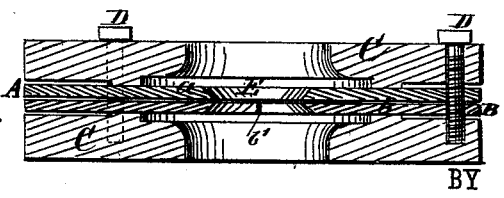

In the accompanying drawing, Figure 1 represents a side view of my improved packing clamped between two flanges and secured on the casing-head of an oil-well. Fig. 2 is a plan view of the said packing with the upper flange removed. Fig. 3 is a vertical section through the packing and flanges, taken on the line $x\ x$ of Fig. 2.

Similar letters of reference indicate corresponding parts.

A and B are two rubber disks, clamped together by and between two flanges, C, by the bolts D, and secured by the same bolts to the head of an oil-well casing, the latter being shown in dotted lines. The disk A is formed of a number of circle-sectors, $a$, joining on the radial lines $a'$, and the disk B is formed of similar sectors $b$, placed to join along their radial lines $b'$. The disk A is placed upon the disk B in such position that the sectors $a'$ of the upper disk cover the joints $b'$ between the sectors $b$ of the lower disk B, and the sectors $b$ cover the joints $a'$ between the sectors $a$, thus insuring tightness of the packing, while allowing of its being made in several pieces to be conveniently removed sidewise from the tubing or drilling cable working in the central hole E of the packing.

The packings now in use for the same purpose are made in one solid piece of rubber, with a central hole to fit the drilling-cable, and cannot be put on or taken off the cable without detaching the drilling-tool, which is larger than the cable and riveted to the latter. The center hole is soon enlarged by friction of the cable, and the packing, once leaky, has to be thrown away; but by my invention, when the hole E is enlarged by wear and becomes leaky, the sectors are cut off a little along one of their radial edges $a'\ b'$, and pushed in nearer to the center until the radial edges meet, and the packing again tightens against and around the circumference of the cable.

Having thus described my invention, I claim as new and desire to secure by Letters Patent—

Two or more centrally-perforated disks, A B, formed of circle-sectors $a\ b$, and clamped together so that the sectors of one disk cover the joint between the sectors of the other disk, in combination with the head and tubing or cable of an oil-well, substantially as and for the purpose set forth.

HENRY S. CATE.

Witnesses:
 JOHN L. LEE,
 C. F. PEIRCE.